July 17, 1956  R. D. ROSS  2,754,970
FLUID SEPARATOR

Filed June 2, 1954  2 Sheets-Sheet 1

INVENTOR,
ROBERT DALRYMPLE ROSS
by Mead, Browne, Schuyler & Beveridge,
Attorneys July 17, 1956  R. D. ROSS  2,754,970
FLUID SEPARATOR
Filed June 2, 1954  2 Sheets-Sheet 2
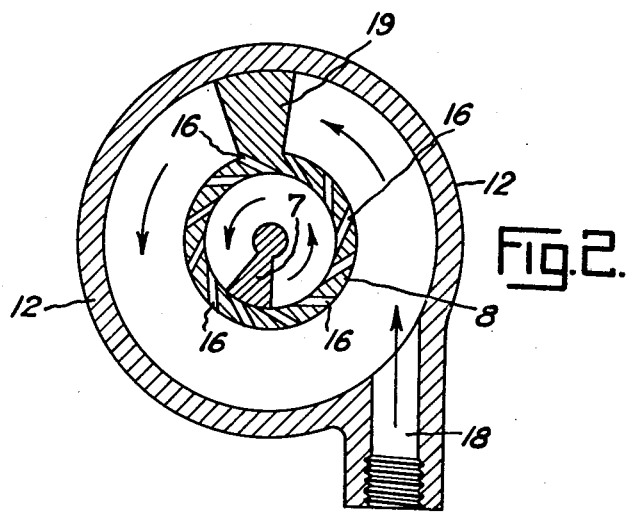
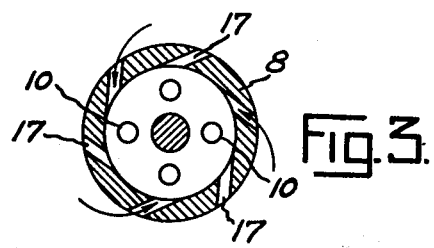
INVENTOR,
ROBERT DALRYMPLE ROSS
by Mead, Browne, Schuyler & Beveridge
Attorneys

United States Patent Office 2,754,970
Patented July 17, 1956

2,754,970

FLUID SEPARATOR

Robert Dalrymple Ross, Camperdown, near Sydney, New South Wales, Australia

Application June 2, 1954, Serial No. 433,972

Claims priority, application Australia June 10, 1953

7 Claims. (Cl. 210—61)

This invention relates to separators for the separation of solid or liquid particles from fluids (liquid, vaporous or gaseous) of lesser specific gravity. In particular, the invention is directed to that class of separators in which the ingoing, fluent stream is delivered to the separator under pressure and issues as a cleaned fluid, expendably usable as in the case of compressed air from which oil, water or other particles have been removed by the separation; or re-usable, as in the case of the circulating oil of an engine from which carbon, metallic, or other particles have been removed.

The object of the present invention is to provide an apparatus which possesses the following advantages:

(a) It has no moving parts.

(b) Even when choked with separated-out particles, it will, in some forms of the invention, still allow a full-bore flow of the fluent stream. This is of particular advantage where the invention is applied, for example, as oil filter to an engine; it being manifestly better for an engine to be supplied with unfiltered oil instead of being deprived or starved of oil. A consequent advantage is that no safety by-pass valve or the like is required.

(c) No pads of felt, cartridges of granulated carbon, or other filter bed media are necessary. An advantage consequent upon this is that no filter bed or the like has to be periodically cleaned or renewed as is the case in many prior separators or filters particularly engine oil filters.

(d) It may be cleaned without need for first obtaining new gaskets or any other replacement parts.

(e) When being cleaned it gives full assurance against accumulated dirt or other particles falling into or otherwise entering the fluent stream space.

(f) In a general way it is highly efficient while being of simple and inexpensive construction.

The present invention contemplates the separating of particles from a fluid whereof the specific gravity is less than that of the particles by helically whirling a stream of the fluid having particles in it so that the particles become centrifugally concentrated in the outer peripheral regions of the stream, causing an outer peripheral fraction of the stream having the particles concentrated therein to depart tangentially from the stream into a surrounding column of the fluid so that the particles carried into the column are projected into the outer peripheral regions of the column, and placing a portion of the column other than the said outer peripheral regions thereof in direct communication with said stream at a part thereof other than that from which said fraction departs.

The foregoing operations are performed by structure including a passage or duct whereof one end is an inlet for a fluid stream, the other end is an outlet for the stream, and whereby a helical path is impressed upon the through-going stream, an outer casing which surrounds the duct, departure openings in the wall of a part of the duct whereby said part constitutes a particle ejector zone and which openings are tangentially co-directed with the whirl direction of a throughgoing stream, and return openings in the duct wall through which the casing interior is open to the duct at a part thereof other than said zone.

In the drawings:

Figure 2 is a sectional plan taken on line 2—2 in Figure 1.

Figure 3 is a sectional plan taken on line 3—3 in Figure 1.

Figure 1:
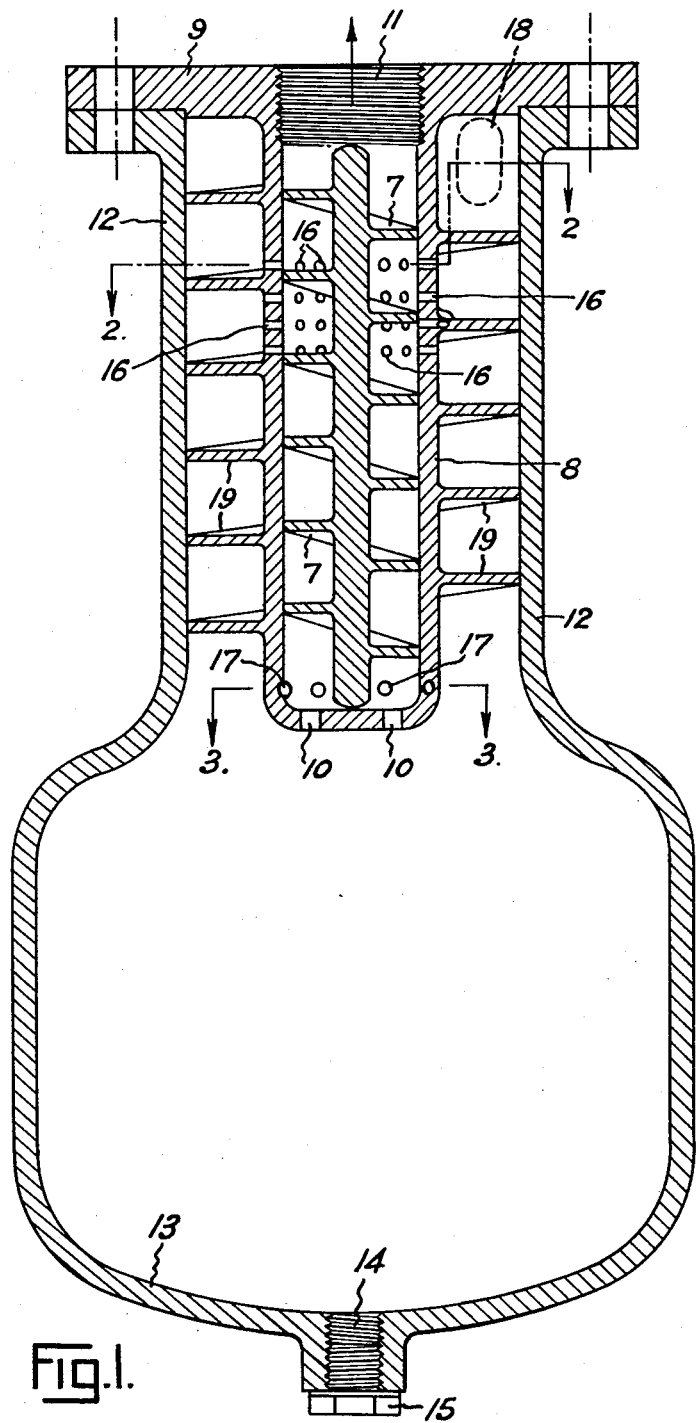
Figure 1 is a medial sectional elevation of a filter suitable, for example, for the separation of "heavier-than-oil" solid or liquid particles from a stream of oil.

Referring to Figures 1 to 3, the separator passage or duct is constituted by the space between the helices of circumferentially continuous stationary helical vane 7 and the wall of a cylindrical sleeve or well 8 depending from a cover plate 9. The holes 10 at the bottom of the well constitute a fluid stream inlet, the open upper end 11 of the well is the stream outlet. This outlet would normally have a pipe connected to it for carrying off the uncontaminated fluid stream.

The separator duct is surrounded by an outer casing 12 (closed at top by cover plate 9) which at bottom is formed as a residues catchment sump 13 having any means, such as mud-hole 14 (normally closed by gasketed plug 15) through which accumulated residues may be removed from time to time.

Particle departure openings 16 are provided in a part of the wall 8 as shown, this part of the wall and the duct portion surrounded thereby constitute the mentioned particle ejector zone. The openings 16 are tangentially co-directed with the whirl direction of a throughgoing fluid stream as indicated in Figure 2.

Return openings 17 are provided in the duct wall, through which the interior of casing 12 is open to the duct at a part thereof other than the mentioned ejector zone. The openings 17 are preferably tangential to the duct interior but counter-directed to the mentioned whirl direction as indicated in Figure 3.

The fluid stream to be sent into or drawn through the separator duct may be entered into the lower end of the well 8 in any convenient manner. For preference, however, the fluid stream arrives by tangentially directed admission pipe 18 and then proceeds down the casing by a helical path constituted by stationary helical vane 19.

When the separator shown in Figures 1 to 3 is in use, the fluid to be separated arrives by way of inlet 18 under pressure due to a pump, or by induction due to a suction pipe connected to the well end 11. If the fluid is liquid the first effect is that the casing 12, the sump 13 and the well 8 are filled by the liquid which then departs by way of outlet 11, thus a sustainedly flowing stream is initiated. As this stream rises in the well 8 it is helically whirled by vane 7 so that any heavy particles in it become concentrated in the outer peripheral regions of the stream. When the stream reaches the ejector zone having the holes 16 therein, the outermost fraction of the stream which has the particles concentrated therein is able to leave the well as a number of jets which issue through the openings 16. These jets in addition to their function as particle carriers, exercise a useful effect in that by reason of their tangentially directed velocity they cause or assist the column of fluid proceeding downwardly of the casing, to be maintained in a whirling condition which tends to keep particles congregated in the outermost regions of the column. It will thus be seen that the vane 19 although desirably present (as explained below) is not essentially present, as a considerable cyclone or whirling effect of the fluid column outside the well 8 will be achieved to the particle laden jets issuing from the holes 16, this cyclone effect being assisted by the tangential disposition of the stream inlet 18. The vane 19 is preferably provided, as it greatly augments the cyclone effect whereby a precentrifuging of the fluid stream takes place before the stream proceeds through the main separation zone in well 8. The precentrifuging causes a preliminary concentration of particles against the walls of the casing, and these particles tend to remain outflung until they reach the sump, in which they are free to settle in the practically stationary mass of fluid therein. Any particles which re-enter the well 8 by way of the holes 10 or 17 are again concentrated in the outer regions of the rising stream prior to arrival in the ejector zone. Upon arrival in that zone the concentrated particles are again exposed to the likelihood or practical certainty of ejectment through holes 16.

The functions of the holes 10 and 17 largely overlap, in that both operate as inlets for the stream proceeding towards the ejector zone. However, the holes 10 may be regarded as the major stream inlet orifices in that they open to the sump at the part thereof least likely to have unwanted particles in it, because at that part (just below the bottom of well 8) whirling action of the slow moving fluid column is still relatively strong (due to the adjacency of the vane 19 and or the incompletely spent whirling action due to the jets from holes 16) so that the particles are still maintained concentrated against the walls of casing 12.

The function of the holes 17 in some degree partakes of a pressure controlling function. It will be apparent that fluid pressure is substantially the same throughout the separator except for relatively small pressure differentials which arise due to centrifugal action and varying stream speeds, and experiment has shown that the separating action is most effective where there are no fluid pressure differences between different points throughout the separator system except for those differentials arising purely from centrifugal and stream-speed causes.

The factor essential to effective separating at the ejector zone is the ability for jets of fluid to emerge from that zone and thus carry particles into the column of fluid externally surrounding the zone. There is, of course, a powerful ejectment effect due to the velocity of the stream creating centrifugal forces therein which cause the outer peripheral margins of the whirling stream to enter the holes 16. This departure is facilitated by the fact that the holes 16 are tangentially co-directed with the stream so that the holes exercise what may be called a scooping action upon the outer peripheral regions of the stream. However, a further important factor in this ejectment is due to the fact that the pressure at the inner ends of the holes 16 is greater than it is at the outer ends of those holes. This pressure disparity is brought about purely kinetically, as a result of the centrifugal forces engendered by constraining the fluid stream to follow a helical path. In other words, the fluid can be regarded (although it fills the duct) as tending to bank up against the inner surface of the well 8, thereby establishing what is, in effect, a radially and outwardly directed hydrostatic head. The same action occurs, less forcibly, in the surrounding fluid column. Even supposing this column to be stationary, there will be a slight excess of pressure at the inner ends of holes 16 over that obtaining at the outer ends of those holes, provided all pressure-difference creating factors, other than the kinetic factor discussed above, are inoperative. Where the outer fluid column has a whirl motion of its own, the kinetically induced scooping action and the pressure difference will be augmented, because the outer column will then also develop a radially and outwardly directed hydrostatic head, thereby to reduce the pressure in the vicinity of the outer ends of the holes 16; and, incidentally, increase it against the casing wall 12.

As indicated above the whirl motion of the outer column could be zero without total loss of the required separating action; but even without other aid, the jets issuing from the holes 16 will impart some whirl motion to the outer column. In the embodiment shown in Figures 1 to 3 this jet action is augmented by tangentially directing the inlet 18 into the casing 12. It is still further augmented by providing the vane 19 to impress whirl motion on the outer fluid column.

It will be appreciated that the pressure difference between the ends of holes 16 is relatively small, hence the necessity for preventing or inhibiting pressure build-up in any part of the separator which would overwhelm the kinetically engendered pressure difference. This prevention or inhibition is effective by placing the outer column and the inner fluid stream in direct communication at some point other than the ejectment zone. This function is performed by the holes 17. The fact that the holes 10 cotnribute to this function is not important, because that is merely coincidental to the embodiment of the invention shown in Figures 1 to 3.

It will be understood that the kinetically established pressure difference can be increased by reducing the pitch of the vane 7 (and that of the vane 19 also if desired) in the vicinity of the ejector zone, so to increase stream circular speed in that zone. In this connection, however, experiment has shown that evenly pitched vanes as shown in Figure 1 give a very high separating efficiency.

While one embodiment for carrying out the inventive concept has been disclosed and described in detail, it will be apparent to those skilled in the art that the specific structure disclosed is capable of modification. Therefore, the foregoing description is intendd to be exemplary rather than limiting and the true scope of my invention is that defined in the following claims.

I claim:

1. Apparatus for separating fluids comprising an outer casing, a fluid stream admission pipe which opens tangentially into the upper end of said casing, a well inside said casing whereof the lower end is open to the interior of said casing and the upper end opens externally of said casing, means in said well for impressing a helical path upon a fluid stream passing from the bottom to the top of said well, and an ejector zone intermediate the ends of said well constituted by departure openings in the well wall.

2. Apparatus for separating fluids comprising an outer casing, a fluid stream admission pipe which opens tangentially into the upper end of said casing, a well inside said casing whereof the lower end is open to the interior of said casing and the upper end opens externally of said casing, a helical vane in said well whereby a helical path is impressed upon a fluid stream passing from the bottom to the top of said well, and an ejector zone intermediate the ends of said well constituted by departure openings in the well wall.

3. Apparatus for separating fluids comprising an outer casing, a fluid stream admission pipe which opens into the upper end of said casing, a well inside said casing whereof the lower end is open to the interior of said casing and the upper end opens externally of said casing, a helical vane in the space between said well and said casing whereby a helical path is impressed upon a fluid stream passing from said admission pipe towards the open lower end of said well, a second helical vane in said well whereby a helical path is impressed upon a fluid stream passing from the bottom to the top of said well, and an ejector zone intermediate the ends of said well constituted by departure openings in the well wall.

4. Apparatus for separating fluids comprising an open top outer casing, a residues catchment sump forming the bottom of said casing, a fluid stream admission pipe which opens tangentially into the upper end of said casing, a cover plate for the open top of said casing, an open ended well depending from said cover plate, means in said well for impressing a helical path upon a fluid stream passing from the bottom to the top of said well, and an ejector zone intermediate the ends of said well constituted by departure openings in the well wall which are tangentially co-directed with said path.

5. Apparatus according to claim 4 wherein said means for impressing a helical path upon a fluid stream comprise a stationary circumferentially continuous helical vane.

6. Apparatus according to claim 4 wherein the opening at the bottom end of said well includes a number of return holes which are tangentially counter-directed to said path.

7. Apparatus according to claim 4 which includes a stationary helical vane in the space between said well and said casing.

References Cited in the file of this patent

UNITED STATES PATENTS

| | | |
|---|---|---|
| 1,386,211 | Tompkins | Aug. 2, 1921 |
| 1,639,538 | Schutz | Aug. 16, 1927 |
| 2,583,166 | Casey | Jan. 22, 1952 |
| 2,657,802 | Reed | Nov. 3, 1953 |

FOREIGN PATENTS

| | | |
|---|---|---|
| 293,551 | Germany | Aug. 17, 1916 |
| 633,607 | Great Britain | Dec. 19, 1949 |